US007154086B2

(12) United States Patent
Laprade
(10) Patent No.: US 7,154,086 B2
(45) Date of Patent: Dec. 26, 2006

(54) CONDUCTIVE TUBE FOR USE AS A REFLECTRON LENS

(75) Inventor: Bruce Laprade, Holland, MA (US)

(73) Assignee: Burle Technologies, Inc., Lancaster, PA (US)

( * ) Notice: Subject to any disclaimer, the term of this patent is extended or adjusted under 35 U.S.C. 154(b) by 0 days.

(21) Appl. No.: 10/795,571

(22) Filed: Mar. 8, 2004

(65) Prior Publication Data

US 2004/0183028 A1 Sep. 23, 2004

Related U.S. Application Data

(60) Provisional application No. 60/455,801, filed on Mar. 19, 2003.

(51) Int. Cl.
*B01D 59/44* (2006.01)

(52) U.S. Cl. ........................ 250/287; 250/290; 250/293

(58) Field of Classification Search ................ 250/287, 250/290, 293
See application file for complete search history.

(56) References Cited

U.S. PATENT DOCUMENTS

| | | | |
|---|---|---|---|
| 2,841,729 | A | 7/1958 | Wiley |
| 3,197,663 | A | 7/1965 | Norman et al. |
| 3,424,909 | A | 1/1969 | Rougeot |
| 3,488,509 | A | 1/1970 | Goodrich |
| 3,519,870 | A | 7/1970 | Jensen |
| 3,634,712 | A | 1/1972 | Orthuber |
| 3,673,449 | A | 6/1972 | Eschard |
| 3,675,063 | A | 7/1972 | Spindt et al. |
| 3,885,180 | A | 5/1975 | Carts, Jr. |
| 3,902,089 | A | 8/1975 | Beasley et al. |
| 3,911,167 | A | 10/1975 | Linder |
| 3,914,517 | A | 10/1975 | Pirooz |
| 3,959,038 | A | 5/1976 | Gutierrez et al. |
| 3,976,905 | A | 8/1976 | Seidman et al. |
| 4,015,159 | A | 3/1977 | Zipfel, Jr. |
| 4,051,403 | A | 9/1977 | Feingold et al. |
| 4,073,989 | A | 2/1978 | Wainer |

(Continued)

FOREIGN PATENT DOCUMENTS

| | | |
|---|---|---|
| CA | 1121858 | 4/1982 |

(Continued)

OTHER PUBLICATIONS

J.P. Boutot, "Degassing of microchannel plates," ACTA Electronica, vol. 14, No. 2, 1971, pp. 245-262.

(Continued)

*Primary Examiner*—Nikita Wells
*Assistant Examiner*—Anthony Quash
(74) *Attorney, Agent, or Firm*—Dann, Dorfman, Herrell and Skillman, P.C.

(57) ABSTRACT

A reflectron lens and method are provided. The reflectron lens comprises a tube having a continuous conductive surface along the length of the tube for providing an electric field interior to the tube that varies in strength along the length of the tube. The tube may comprise glass, and in particular, a glass comprising metal ions, such as lead, which may be reduced to form the conductive surface. The method includes a step of introducing a beam of ions into a first end of a dielectric tube having a continuous conductive surface along the length of the tube. The method further includes a step of applying an electric potential across the tube to create an electric field gradient that varies in strength along the length of the tube so the electric field deflects the ions to cause the ions to exit the tube through the first end of the tube.

12 Claims, 4 Drawing Sheets

U.S. PATENT DOCUMENTS

| | | | |
|---|---|---|---|
| 4,093,562 A | 6/1978 | Kishimoto | |
| 4,095,136 A | 6/1978 | Niklas | |
| 4,099,079 A | 7/1978 | Knapp | |
| 4,217,489 A | 8/1980 | Rosier | |
| 4,236,073 A | 11/1980 | Martin | |
| 4,267,442 A | 5/1981 | Rosier | |
| 4,352,985 A | 10/1982 | Martin | |
| 4,454,422 A | 6/1984 | Persyk | |
| 4,468,420 A | 8/1984 | Kawahara et al. | |
| RE31,847 E | 3/1985 | Luckey | |
| 4,558,144 A | 12/1985 | Fay et al. | |
| 4,563,250 A | 1/1986 | Becker et al. | |
| 4,577,133 A | 3/1986 | Wilson | |
| 4,589,952 A | 5/1986 | Behringer et al. | |
| 4,624,736 A | 11/1986 | Gee et al. | |
| 4,624,739 A | 11/1986 | Nixon et al. | |
| 4,659,429 A | 4/1987 | Isaacson et al. | |
| 4,693,781 A | 9/1987 | Leung et al. | |
| 4,698,129 A | 10/1987 | Puretz et al. | |
| 4,707,218 A | 11/1987 | Giammarco et al. | |
| 4,714,861 A | 12/1987 | Tosswill | |
| 4,725,332 A | 2/1988 | Spohr | |
| 4,731,559 A | 3/1988 | Eschard | |
| 4,734,158 A | 3/1988 | Gillis | |
| 4,740,267 A | 4/1988 | Knauer et al. | |
| 4,764,245 A | 8/1988 | Grewal | |
| 4,780,395 A | 10/1988 | Saito et al. | |
| 4,786,361 A | 11/1988 | Sekine et al. | |
| 4,790,903 A | 12/1988 | Sugano et al. | |
| 4,794,296 A | 12/1988 | Warde et al. | |
| 4,800,263 A | 1/1989 | Dillon et al. | |
| 4,802,951 A | 2/1989 | Clark et al. | |
| 4,806,827 A | 2/1989 | Eschard | |
| 4,825,118 A | 4/1989 | Kyushima | |
| 5,086,248 A | 2/1992 | Horton et al. | |
| 5,205,902 A | 4/1993 | Horton et al. | |
| 5,351,332 A | 9/1994 | Cook | |
| 5,378,960 A | 1/1995 | Tasker et al. | |
| 5,726,076 A | 3/1998 | Tasker et al. | |
| 6,008,491 A * | 12/1999 | Smentkowski et al. | 250/309 |
| 6,369,383 B1 * | 4/2002 | Cornish et al. | 250/286 |
| 6,607,414 B1 * | 8/2003 | Cornish et al. | 445/35 |
| 6,717,135 B1 * | 4/2004 | Hansen | 250/287 |
| 6,825,474 B1 * | 11/2004 | Young | 250/396 R |
| 2003/0230726 A1 * | 12/2003 | Van der Veer et al. | 250/396 R |

FOREIGN PATENT DOCUMENTS

| | | |
|---|---|---|
| EP | 0704879 | 4/1996 |
| GB | 2180986 | 4/1987 |

OTHER PUBLICATIONS

N.R. Rajopadhye et al., "Characterization of $A1_2$ $O_3$ Films Deposited by Various Methods," Thin Solid Films, 142 (1986) 127-138.

A.M. Then et al., "Formation and Behavior of Surface Layers on Electron Emission Glasses," Jour. of Non-Crystalline Solids 120 (1990) 178-187.

N.R. Whetten et al., "Secondary Electron Emission for MgO Thin Films," Journal of Applied Physics, vol. 30, No. 3, (Mar. 1959), pp. 432-435.

E. Gatti et al., "Study of the Electric Field Inside Microchannel Plate Multipliers," © 1983 IEEE.

L.P. Andersson et al., "The Parallel-Plate Electron Multiplier," © 1979 The Institute of Physics, 1015-1022.

L.H. van vlack, Elements of Materials Science & Engineering, Addison-Wesley, Reading, MA, 1980.

M. Lampton, "The Microchannel Image Intensifier," Sci. Am. Nov. 1981, vol. 245, No. 5.

A.M. Tyutikov et al., "Study of the Surface Layer Composition and the Secondary Electron Emission Coefficient at Lead Silicate Glasses," Sov. J. Opt. Technol. (Apr. 1980).

Ju.M. Simeonova et al., "Surface Compositional Studies of Heat Reduced Lead Silicate Glass," Jour. of Non-Crystalline Solids, 57 (1983), pp. 177-187.

N.R. Whetton, Methods of Experimental Physics, Academic Press, New York 1964, pp. 69-85.

R.U. Martinelli et al., "The Application of Semiconductors with Negative Electron Affinity Surface to Electron Emission Devices," Proceedings of the IEEE, vol. 62, No. 10, (Oct. 1974).

D. Washington et al., "Technology of Channel Plate Manufacture," ACTA Electronica vol. 14, No. 2, 1971, pp. 201-224.

H.J.L. Trap, "Electronic Conductivity in Oxide Glasses," ACTA Electronica, vol. 14, No. 1, 1971, pp. 41-77.

G.E. Hill, "Secondary Electron Emission and Compositional Studies on Channel Plate Glass Surfaces," Advances in Electronics and Electron Physics, vol. 40A Ed. 2, Academic Press 1976.

W. Kern et al., "Chemical Vapor Deposition of Inorganic Thin Films," Thim Films Processes, © 1978 Academic Press, Inc. pp. 257-331.

P.D. Dapkus "Metalorganic Chemical Vapor Deposition," Ann. Rev. Mater. Sci., 1982 12:243-69.

A.C. Adams, "Dielectric and Polysilicon Film Deposition," VLSI Technology, McGraw-Hill, New York 1983.

M.L. Green et al., "Chemical vapor Deposition of Metals for Integrated Circuit Applications," Jour. of Metals, Jun. 1985.

S. Wolf et al., "Silicon Epitaxial Film Growth," Silicon Processing for the VLSI Era, pp. 124-159.

A. R. Coulson et al., "Chemical Vapor Deposition of Amorphous and Polycrystalline Thin Films,", Silicon Processing for the VLSI Era, pp. 161-197.

"Thermal Oxidation of Single Crystal Silicon," © 1965 IEEE, pp. 198-241.

D.P. Stinton et al., "Advanced Ceramics by Chemical Vapor Deposition Techniques," Ceramic Bulletin, vol. 67, No. 2, 1988, pp. 350-355.

J.R. Hollahan et al., "Plasma Deposition of Inorganic Thin Films," Thin Films Processes, Academic Press Inc., © 1978. pp. 335-360.

P.K. Bachman et al., "Plasma-Assisted Chemical Vapor Deposition Processes," MRS Bulletin, Dec. 1988, pp. 52-59.

M.J. Mayo, "Photodeposition: Enhancement of Deposition Reactions by Heat and Light," Solid State Technology, Apr. 1986.

C.G. Pantano, "Electron Beam Damage in Auger Electron Spectroscopy," Application of Surface Science 7, (1981), pp. 115-141.

W.B. Feeler et al., "Low Noise Microchannel Plates," SPIE Conf., Los Angeles, CA, Jan. 15-20, 1989.

G.W. Goodrich et al., "Resistance Strip Magnetic Electron Multiplier," The Review of Scientific Instruments, vol. 32, No. 7, (Jul. 1961), pp. 846-849.

K. Oba, "An Analysis of the Direct Current Operation of Channel Electron Multipliers," Advances in Electronics and Electron Physics, Academic Press 1972, pp. 183-205.

H. Becker, "Preparation and Characteristics of a Channel Electron Multiplier," The Review of Scientific Instruments, vol. 43, No. 11, (Nov. 1972) pp. 1587-1589.

Y. Sakai, "Study of Gain Fatigue Mechanism in Channel Electron Multipliers," Surface Science 86 (1979) pp. 359-368.

A.A. Manalio et al., "More Efficient Channel Electron Multiplier by Coating of the Cone with a High Secondary Electron Yield Material," Rev. Sci. Instru. S2(10), Oct. 1981.

G. Harbeke, "LPCVD Polycrystalline Silicon: Growth and Physical Properties of In-Situ Phosphorus Doped and Undoped Films," RCA Review, vol. 44, Jun. 1983, pp. 287-312.

R.V. Prasad et al., "Semi-Insulating Polysilicon: Growth, Processing and Structural Characterization," Materials Letters, vol. 4, No. 2, (Feb. 1986). pp. 71-76.

R.S. Ehle, "Low Temperature Aluminum Oxide Deposition Using Trimethyaluminum," Jour. of Electronic Materials, vol. 12, No. 3, 1983, pp; 587-601.

G. Eschard et al., "Principle and Characteristics of Channel Electron Multipliers," ACTA Electronica, vol. 14, No. 1, 1971, pp. 19-39.

G.W. Tasker et al., "Thin Film Amorphous Silicon Dynodes for Electron Multiplication," Mat. Res. Soc. Symp. Proc., vol. 192, © 1990, pp. 459-466.

J.R. Horton, "Characteristics and Applications of Advanced Technology Microchannel Plates,"SPIE vol. 1306, Sensor Fusion III (1990), pp. 169-178.
Handbook of Thin Film Technology, edited by L.I. Maissel et al., McGraw-Hill, New York 1983, pp. 6-18.
K.I. Grais et al., "A study of secondary electron emission in insulators and semiconductors," J. Appl. Phys. 53(7), Jul. 1982, pp. 5239-5242.
N. Iwase, "Aluminum Nitride Substrates Having High Thermal Conductivity," Solid State Technology (Oct. 1986), pp. 135-138.
H. Nagayama et al., "A New Process for Silica Coating," Jour. of the Electrochemical Society, vol. 135, No. 8 (Aug. 1988), pp. 2013-2016.
R.H. Sokol et al., "Characterization of Single Channel Electron Multipliers," Mass Spec Source, vo. XI, No. 2, (Aug. 1988).
Cotter, Robert J., "Time-of-Flight Mass Spectrometry for the Structural Analysis of Biological Molecules" Analytical Chemistry, vol. 64, No. 21, (1992) pp. 1027-1039.
Hoffman, E., Charette, J., and Stroobant, V., "Time-of-Flight Analyzers" Mass Spectrometry, Wiley Press (1996) pp. 59-66.
Laprade, B. and Starcher, R., "Development of a 2-um-Pore Microchannel Plate" Spectrometry, (Oct. 2001) 8 pages.
Trap, H.J.L., "Electronic Conductivity in Oxide Glasses" ACTA Electronica, vol. 14. No. 1, (1971) pp. 41-77.
European Search Report for application No. 04251557.7 dated Feb. 10, 206.
Appel, Matthew F. et al. "Conductive Carbon Filled Polymeric Electrodes: Novel lon Optical Elements for Time -of -Flight Mass Spectrometers" Journal of American Society for Mass Spectrometry, Elsevier Science Inc., New York, NY, vol. 13, No. 10, Oct. 2002, pp. 1170-1175.
Trap, H.J.L., "Electronic Conductivity in Oxide Glasses La Conductibilite Electronique Dans Les Verres D'Oxydes" ACTA Electronica, Paris, FR, vol. 14, No. 1, Jan. 1971, pp. 41-77.

* cited by examiner

CONDUCTIVE TUBE FOR USE AS A REFLECTRON LENS

This application claims priority under 35 U.S.C. §119(e) from U.S. Provisional Application No. 60/455,801, filed Mar. 19, 2003, which is incorporated herein by reference.

FIELD OF THE INVENTION

The present invention relates generally to a dielectric tube for use as a reflectron lens in a time of flight mass spectrometer, and more particularly, to a glass tube having a conductive surface for use as a reflectron lens in a time of flight mass spectrometer.

BACKGROUND OF THE INVENTION

Time of Flight Mass Spectrometry (TOF-MS) is rapidly becoming the most popular method of mass separation in analytical chemistry. This technique is easily deployed, can produce very high mass resolution, and can be adapted for use with many forms of sample introduction and ionization. Unlike quadrupoles and ion traps, time of flight mass analyzers perform well at very high mass. Descriptions of described time of flight analyzers maybe found in Wiley and McLaren (Rec. Sci. Instrum., 26, 1150 (1950)), Cotter (Anal. Chem., 1027A (1992)), and Wollnik (Mass Spectrom Rev., 12, 89 (1993)).

Time of flight mass spectrometers are produced in two main configurations: linear instruments and reflectron instruments. In operation of either configuration of mass spectrometer an unknown sample is converted to ions. For example, a sample may be ionized using a MALDI (Matrix Assisted Laser Desorption Ionization) instrument 100, as illustrated in FIG. 1. The ions created by laser ionization of the sample are injected into a flight tube 10 where they begin traveling towards a detector 20. The motion of the ions within the flight tube 10 can be described by:

$$t^2=m/z\ (d^2/2V_{se}), \qquad (1)$$

where m/z is the mass to charge ratio of the ion, d is the distance to the detector 20, and $V_{se}$ is the acceleration potential. The lighter ions (low mass) travel faster than the higher mass ions and therefor arrive at the detector 20 earlier than the higher mass ions. If the flight tube 10 is long enough, the arrival times of all of the ions at the detector will be distributed according to mass with the lowest mass ions arriving first, as shown in FIG. 2.

When the ions arrive at the detector 20, e.g., a multi-channel plate detector, the ions initiate a cascade of secondary electrons, which results in the generation of very fast voltage pulses that are correlated to the arrival of the ions. A high-speed oscilloscope or transient recorder maybe used to record the arrival times. Knowing the exact arrival times, equation (1) can be used to solve for the mass to charge ratio, m/z, of the ions.

The second type of time of flight mass spectrometer is a reflectron instrument 300 as shown in FIG. 3. The reflectron design takes advantage of the fact that the farther the ions are allowed to travel, the greater the space between ions of differing masses becomes. Greater distances between ions with different masses increase the arrival time differences between the ions and thereby increase the resolution with which ions of a similar m/z can be differentiated. In addition, a reflectron design corrects the energy dispersion of the ions leaving the source.

The reflectron instrument 300 includes a reflectron analyzer 350 comprising a flight tube 310, reflectron lens 330, and a detector 320. The flight tube 310 includes a first, input end 315 at which the detector 320 is located and a second, reflectron end 317 at which the reflectron lens 330 is located. The ions are injected into the flight tube 310 at the input end 315 in a similar manner as a linear instrument. However, rather than detecting the ions at the opposing second end 317 of the flight tube 310, the ions are reflected back to the input end 315 of the flight tube 310 by the reflectron lens 330 where the ions are detected. As shown in FIG. 3, the ions travel along a path "P" which effectively doubles the length of the flight tube 310.

The reflection of the ions is effected by the action of an electric field gradient created by the reflectron lens 330 along the lens axis. Ions traveling down the flight tube 310 enter the reflectron lens 330 at a first end 340 of the reflectron lens 330. The electrostatic field created by applying separate high voltage potentials to each of a series of metal rings 332 of the lens 330, slows the forward progress of the ions and eventually reverses the direction of the ions to travel back towards the first end 340 of the lens 330. The ions then exit the lens 330 and are directed to the detector 320 at the first end 315 of the flight tube 310. The precision ground metal rings 332 are stacked in layers with insulating spacers 334 in between the metal ring layers. The rings 332 and spacers 334 are held together with threaded rods. This assembly may have hundreds of components which must be carefully assembled (typically by hand) in a clean, dust free environment. Such a lens assembly having many discrete components can be costly and complicated to fabricate. Moreover, the use of discrete metal rings 332 necessitates the use of a voltage divider at each layer of rings 332 in order to produce the electrostatic field gradient necessary to reverse the direction of the ions.

Accordingly, it would be an advance in the state of the art to provide a reflectron lens having a continuous conductive surface and which could introduce an electric field gradient without the use of multiple voltage dividers.

SUMMARY OF THE INVENTION

In response to the above needs, the present invention provides a reflectron lens for use in a reflectron analyzer. The reflectron lens comprises a tube having a continuous conductive surface along the length of the tube for providing an electric field interior to the tube that varies in strength along the length of the tube. The tube may comprise glass, and in particular, a glass comprising metal ions, such as lead, which may be reduced to form the conductive surface. In one configuration of the present invention, the conductive surface may be the interior surface of the tube. The tube may comprise a ceramic material and the conductive surface a glass coating on the ceramic material.

The present invention also provides a method for reflecting a beam of ions. The method includes a step of introducing a beam of ions into a first end of a dielectric tube having a continuous conductive surface along the length of the tube. The method further includes a step of applying an electric potential across the tube to create an electric field gradient that varies in strength along the length of the tube so that the electric field deflects the ions to cause the ions to exit the tube through the first end of the tube.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
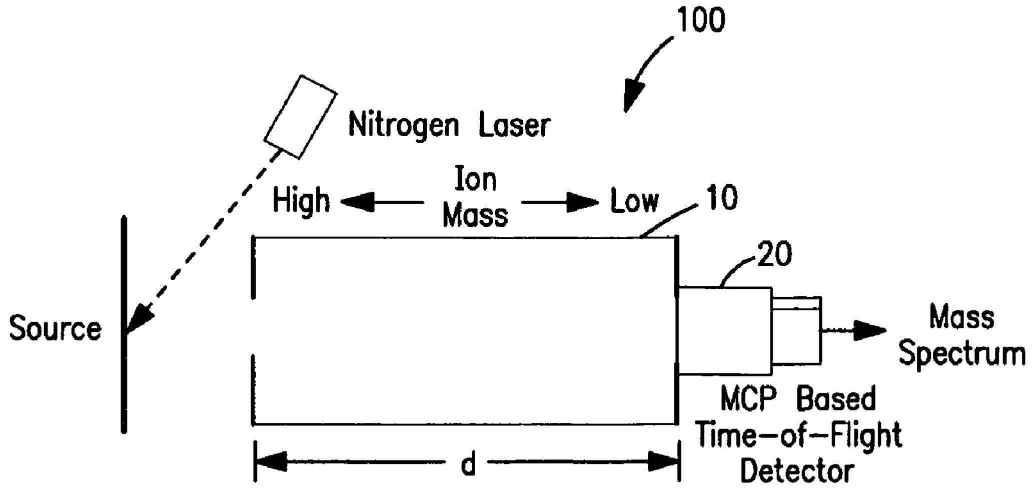
FIG. 1 schematically illustrates a cross sectional view of a linear time of flight instrument.
Figure 2:
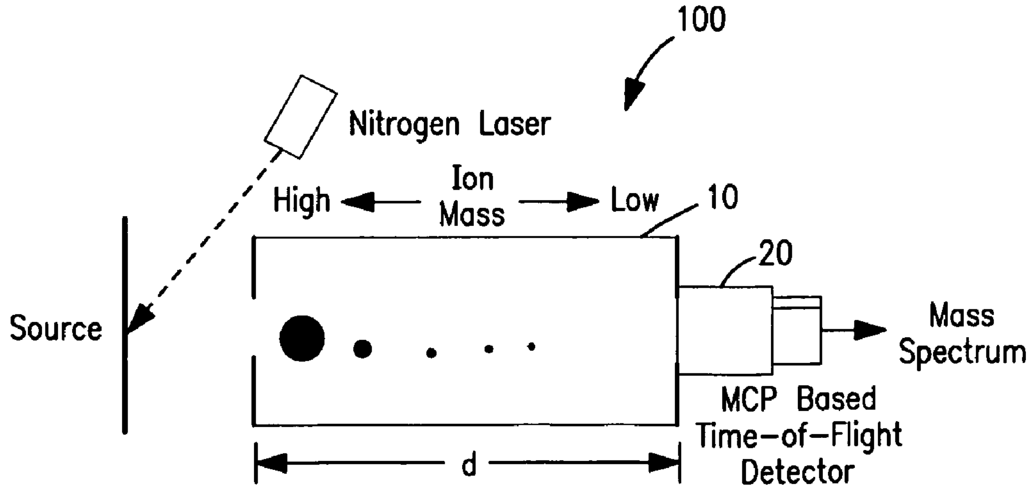
FIG. 2 schematically illustrates a distribution of ions according to mass upon passage through the instrument of FIG. 1.
Figure 3:
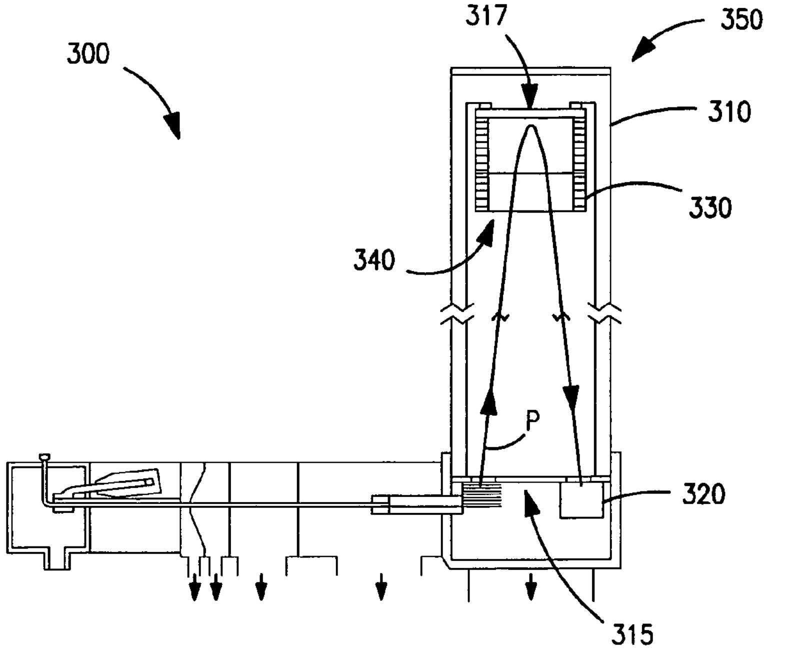
FIG. 3 schematically illustrates a reflectron time of flight instrument.
Figure 4:
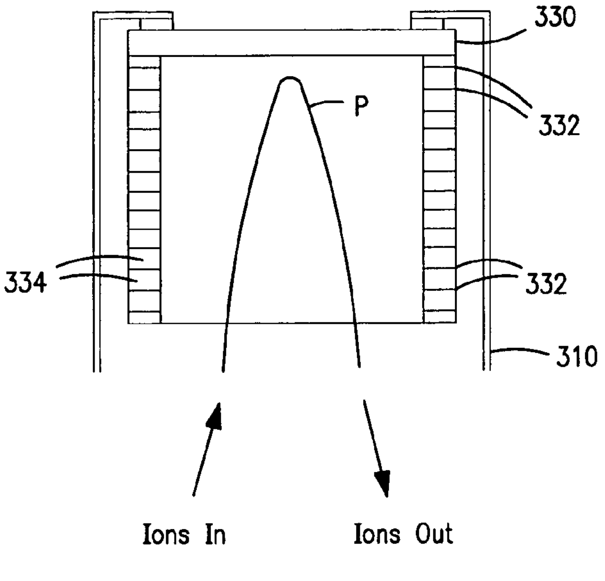
FIG. 4 schematically illustrates a cross-sectional view of a conventional reflectron lens.
Figure 5:
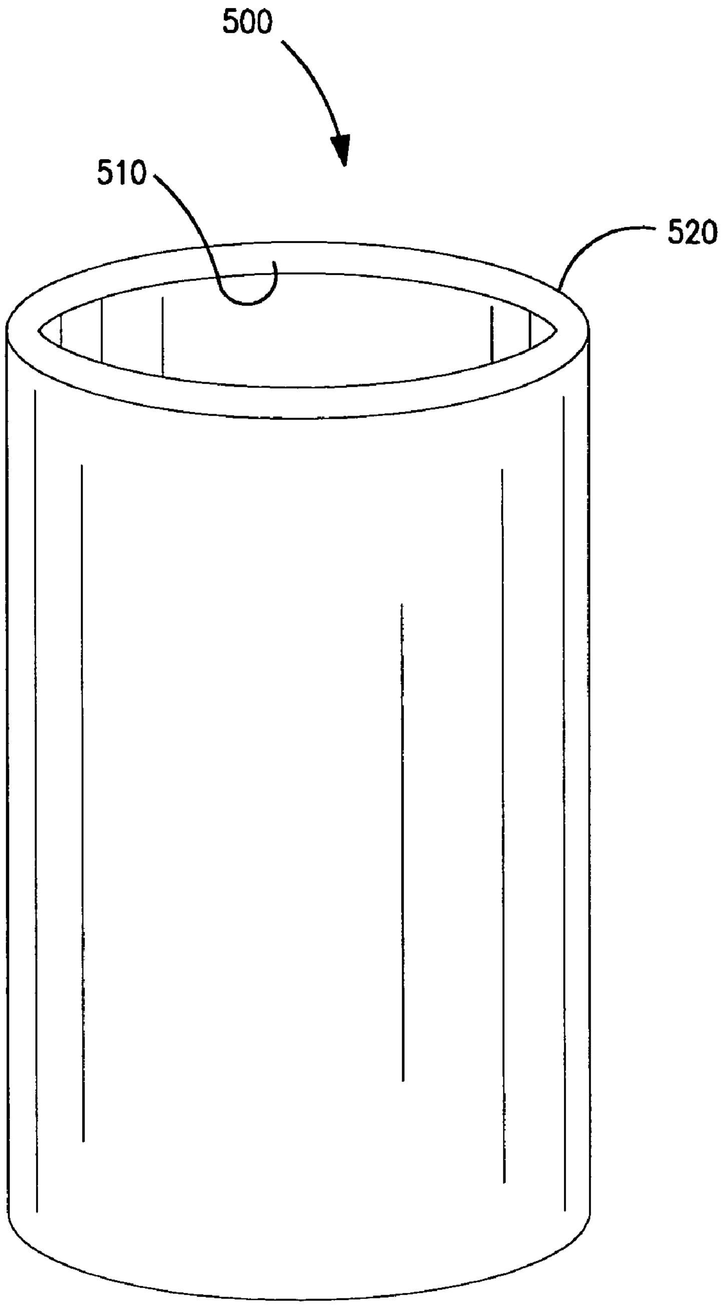
FIG. 5 schematically illustrates a perspective view of a reflectron lens in accordance with the present invention.
Figure 6:
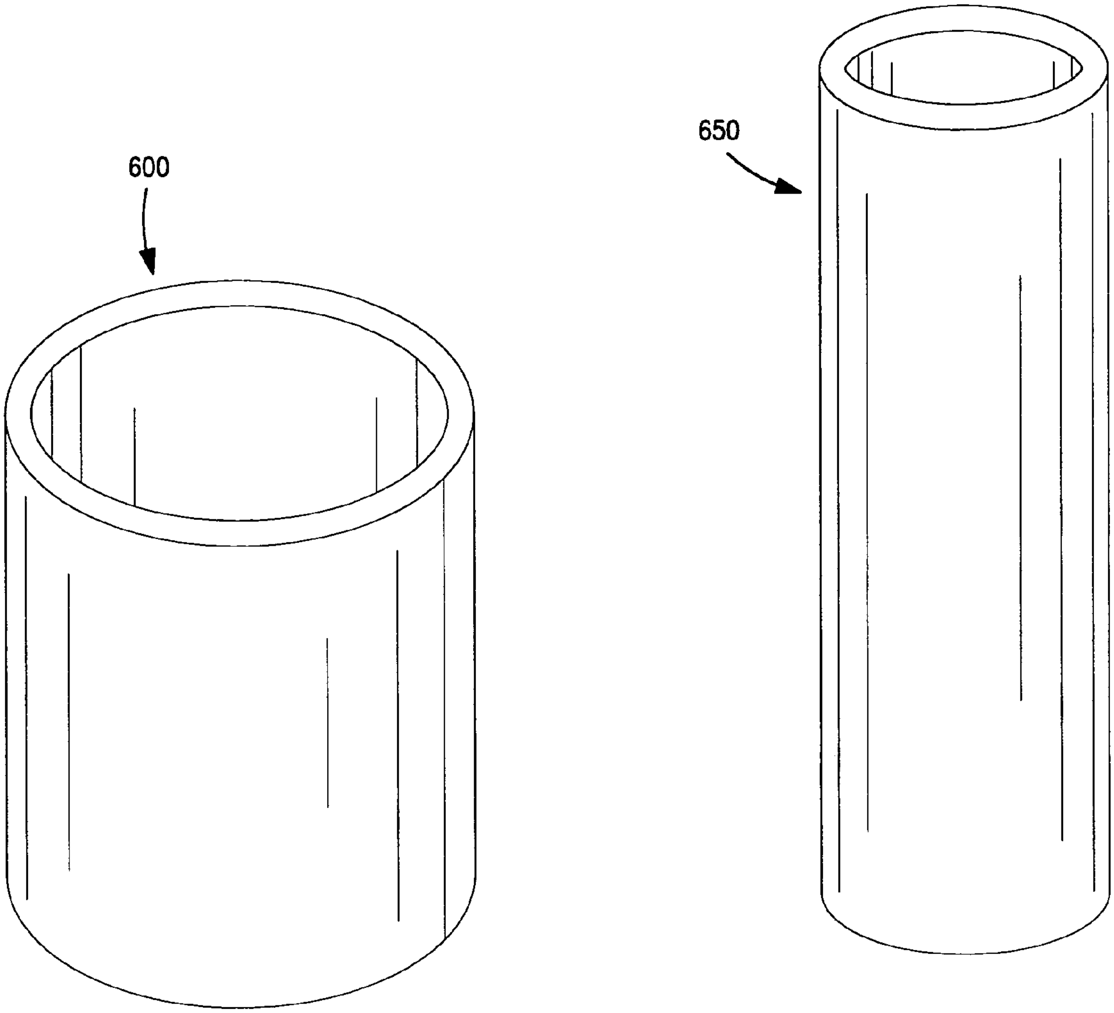
FIG. 6 illustrates lead silicate reflectron lenses fabricated in accordance with the present invention.

Referring now to FIGS. 5 and 6, electrostatic reflectron lenses 500, 600, 650 are illustrated in accordance with the present invention. Turning to FIG. 5 in particular, a reflectron lens 500 having a generally tubular shape is illustrated. The tube includes an inner surface 510 and an outer surface 520, at least one of which surfaces 510, 520 is an electrically conductive surface. As used herein a conductive surface includes a resistive surface and a semi-conductive surface. The reflectron lens 500 may be a cylindrical tube having a circular cross-sectional shape, as shown. Alternatively, the reflectron lens 500 may be a tube having a non-circular cross-sectional shape, such as elliptical, square, or rectangular, for example. In addition, while the reflectron lens 500 is illustrated as having a cross-sectional shape that is constant along the length of the tube, reflectron lenses in accordance with the present invention may also have a cross-sectional shape that varies along the length of the tube.

Reflectron lenses in accordance with the present invention may desirably be fabricated from a dielectric material. For example, the reflectron lens 500 may comprise a glass, such as a lead silicate glass. Examples of suitable glasses for use in reflectron lenses of the present invention include BURLE Electro-Optics Inc (Sturbridge Mass., USA) glasses MCP-10, MCP-12, MCP-9, RGS 7412, RGS 6512, RGS 6641, as well as Corning Glass Works (Corning N.Y., USA) glass composition 8161 and General Electric glass composition 821. Other alkali doped lead silicate glasses may also be suitable. In addition, non-silicate glasses may be used. Generally, any glass susceptible to treatment that modifies at least one surface of the glass tube to create a conducting surface on the glass tube, such as a hydrogen reduction treatment, is suitable for use in the present invention. Non-lead glasses may also be used, so long as the glass contains at least one constituent that may be modified to provide a conducting surface on the glass tube. Alternatively, the reflectron lens 500 may comprise a non-glass tube onto which a glass layer is deposited. Such a glass layer should be deposited on the surface of the reflectron lens 500 which is to be conductive.

A selected glass surface, or all glass surfaces, of the reflectron lens 500 is processed to make the glass surface(s) conductive. In one desirable configuration, the inside surface 510 of the reflectron lens 500 is subjected to a hydrogen reduction process. In this process, a metal oxide in the glass, such as lead oxide, is chemically reduced to a semi-conductive form. A hydrogen reduction process used to make alkali doped lead silicate glass electrically conductive is described by Trap (HJL) in an article published in ACTA Electronica (vol. 14 no 1, pp. 41–77 (1971)), for example. Changing the parameters of the reduction process can vary the electrical conductivity.

The hydrogen reduction process comprises loading the glass tube into a closed furnace through which pure hydrogen or a controlled mixture of hydrogen and oxygen is purged. The temperature is gradually increased, typically at a rate of 1–3 degrees C. per minute. Beginning at approximately 250° C., a chemical reaction occurs in the glass in which a metal oxide in the glass, such as lead oxide, is converted (reduced) to a conductive state. This reaction typically occurs in the first few hundred Angstroms of the surface. Continued heating and exposure to hydrogen produces more reduced metal oxide, which further lowers the resistance along the reflectron lens 500. Temperature, time, pressure and gas flow are all used to tailor the resistance of the conductive surface to the desired application. The soak temperature is selected to be sufficiently high to cause reduction of the metal oxide. The maximum soak temperature is selected to be below the sag point of the glass. If desired, unwanted portions of conductive surfaces can be stripped by chemical or mechanical means.

In operation, a voltage is applied across the reflectron lens 500 from end to end. The conductive inside surface 510 of the reflectron lens 500 produces an electric field gradient along the longitudinal axis of the reflectron lens 500. The field gradient produced by the continuous conductive inside surface 510 causes the ion beam to gradually reverse direction as opposed to the stepwise direction changes caused by a conventional reflectron lens. The smooth, non-stepwise action of the reflectron lens 500 of the present invention permits improved beam confinement, enabling a smaller area detector to be used. Improved ion energy dispersion reduction also results from the use of the reflectron lens 500 of the present invention. A reduction in ion energy dispersion and improved ion beam confinement leads to improved sensitivity and mass resolution in an instrument using a reflectron lens 500 of the present invention.

EXAMPLES

Reflectron lenses 600,650 of the present invention were fabricated from lead glass tubes of BURLE MCP-10 glass. The first reflectron lens 600 had the following physical dimensions: length of 3.862 inches; inner diameter of 2.40 inches; and, an outer diameter of 2.922 inches. The second reflectron lens 650 had the following physical dimensions: length of 6.250 inches; inner diameter of 1.200 inches; and, outer diameter of 1.635 inches.

The reflectron lenses 600,650 were placed in a hydrogen atmosphere at a pressure of 34 psi and a hydrogen flow of 40 l/m. The lenses 600, 650 were heated in the hydrogen atmosphere according to the following schedule. The temperature was ramped from room temperature to 200° C. over 3 hours. The temperature was then ramped to 300° C. over 1 hour, and then was ramped to 445° C. over 12.5 hours. The tube was held at 445° C. for 3 hours. The end to end resistance of the first reflectron lens 600 was measured to be $2.9\times10^9$ ohms, and the end to end resistance of the second reflectron lens 650 was measured to be $3.0\times10^9$ ohms.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A reflectron analyzer comprising:

a reflectron lens comprising a glass tube comprising metal ions disposed therein and comprising a surface region of the tube comprising a reduced form of the metal ions to provide a continuous conductive surface along the length of the tube for providing an electric field interior to the tube that varies in strength along the length of the tube; and a voltage supply electrically connected to opposing ends of the tube to apply a voltage potential across the tube to create the electric field.

2. The reflectron analyzer according to claim 1, wherein the conductive surface comprises the interior surface of the tube.

3. The reflectron analyzer comprising:

a ceramic tube;

a glass coating disposed on the ceramic material, the glass coating comprising metal ions disposed therein and comprising a surface region comprising a reduced form of the metal ions to provide a continuous conductive surface along the length of the tube for providing an electric field interior to the tube that varies in strength along the length of the tube; and a voltage supply electrically connected to opposing ends of the tube to apply a voltage potential across the tube to create the electric field.

4. The reflectron analyzer according to claim 1, wherein the tube comprises a lead silicate glass.

5. The reflectron analyzer according to claim 1, wherein the tube comprises at least one of a circular cross-sectional shape, an elliptical cross-sectional shape, a rectangular cross-sectional shape, and a square cross section.

6. The reflectron analyzer according to claim 1, wherein the tube comprises a non-circular cross-sectional shape.

7. The reflectron analyzer according to claim 1, wherein the tube comprises a cross-sectional shape is constant along the length of the tube.

8. The reflectron analyzer according to claim 1, wherein the tube is monolithic.

9. The reflectron analyzer according to claim 1, wherein the tube comprises stacked rings of conductive glass tubes.

10. A method for reflecting a beam of ions comprising:

providing a glass tube comprising metal ions disposed therein and comprising a surface region of the tube comprising a reduced form of the metal ions to provide a continuous conductive surface along the length of the tube for providing an electric field interior to the tube that varies in strength along the length of the tube;

introducing a beam of ions into a first end of the glass tube; and applying an electric potential across the tube to create an electric field gradient that varies in strength along the length of the tube so that the electric field deflects the ions to cause the ions to exit the tube through the first end of the tube.

11. The method according to claim 10, wherein the step of applying an electric potential comprises creating an electric field gradient that causes the ions to be deflected without the ions contacting the tube.

12. The reflectron analyzer according to claim 1, wherein the tube comprises a single glass tube.

* * * * *